(12) United States Patent
Park et al.

(10) Patent No.: US 11,532,332 B2
(45) Date of Patent: Dec. 20, 2022

(54) VIDEO CONTENT COLLECTION AND USAGE SYSTEM AND METHOD

(71) Applicant: Story Now LLC, Charlotte, NC (US)

(72) Inventors: Tamara Joi Park, Charlotte, NC (US); Michael Lewis Gray, Charlotte, NC (US)

(73) Assignee: Story Now LLC, Charlotte, NC (US)

( * ) Notice: Subject to any disclaimer, the term of this patent is extended or adjusted under 35 U.S.C. 154(b) by 0 days.

(21) Appl. No.: 17/382,120

(22) Filed: Jul. 21, 2021

(65) Prior Publication Data
US 2022/0028426 A1 Jan. 27, 2022

Related U.S. Application Data

(60) Provisional application No. 63/054,570, filed on Jul. 21, 2020.

(51) Int. Cl.
| | |
|---|---|
| *G11B 27/036* | (2006.01) |
| *G06F 40/279* | (2020.01) |
| *G06F 40/30* | (2020.01) |
| *G06V 20/40* | (2022.01) |
| *H04N 5/77* | (2006.01) |
| *H04N 5/93* | (2006.01) |
| *G06V 10/94* | (2022.01) |
| *G11B 27/031* | (2006.01) |
| *H04N 5/232* | (2006.01) |
| *H04N 5/76* | (2006.01) |
| *H04N 21/414* | (2011.01) |
| *H04N 21/4223* | (2011.01) |
| *H04N 21/44* | (2011.01) |
| *H04N 21/466* | (2011.01) |

(Continued)

(52) U.S. Cl.
CPC .......... *G11B 27/036* (2013.01); *G06F 40/279* (2020.01); *G06F 40/30* (2020.01); *G06V 20/40* (2022.01); *H04N 5/77* (2013.01); *H04N 5/9305* (2013.01)

(58) Field of Classification Search
USPC .................................. 386/239–248, 278–290
See application file for complete search history.

(56) References Cited

U.S. PATENT DOCUMENTS

6,748,421 B1 * 6/2004 Ozkan .................... G06F 3/0481
 709/219
9,531,987 B1 * 12/2016 Melo .................... G11B 27/031
(Continued)

*Primary Examiner* — Hung Q Dang (57) ABSTRACT

A video content collection system for equipping non-technical users with a content collection platform on a computing device having a camera, such as a mobile phone or tablet, that creates custom strategic video stories maximizing story-craft toward a particular aim and possibly having a positive effect on individuals involved in the stories. The platform allows for the creation of custom videos according to a selected template following a storytelling framework. The custom videos are compiled, potentially with release forms and a default arrangement following the storytelling framework and provided to a final content generation system to generate the final content and save it in a data store accessible to the computing device. The final content generation system, internally or externally to the computing device, performs editing tasks to return a final video or generates desired final content based on scoring of the custom video and processed data therefrom.

4 Claims, 6 Drawing Sheets

(51) Int. Cl.
*H04N 21/472* (2011.01)
*H04N 21/854* (2011.01)

(56) References Cited

U.S. PATENT DOCUMENTS

| | | | | |
|---|---|---|---|---|
| 11,204,959 | B1* | 12/2021 | Boyd | G06F 16/71 |
| 11,335,349 | B1* | 5/2022 | Farsaii | G06N 20/00 |
| 2005/0102521 | A1* | 5/2005 | Belz | H04N 1/32101 |
| | | | | 713/176 |

* cited by examiner

VIDEO CONTENT COLLECTION AND USAGE SYSTEM AND METHOD

CROSS-REFERENCE TO RELATED APPLICATIONS

The present application claims benefit to U.S. Provisional Patent Application No. 63/054,570, which was filed on Jul. 21, 2020. The contents of the above-identified application are incorporated by reference in their entirety as if recited in full herein.

FIELD

The present invention is related generally to systems and methods for collecting and using video content with a computing device having a camera, such as a mobile phone or tablet. More specifically, certain embodiments are directed to systems and methods for enabling users to create strategic video stories, from collected custom videos, to achieve particular aims, such as business and/or personal goals or social impact.

BACKGROUND OF THE INVENTION

Storytelling is one of the most ancient forms of communication and remains one of the most effective. When used strategically, stories can persuade people to purchase products and inspire social action; stories can evoke sympathy and create connection. The act of telling one's story can even promote positive effects on one's mental well-being.

However, it is often difficult for individuals to know how to craft strategic video stories that maximize positive effects for a person or a particular aim, such as business and/or personal goals, social impact, and the like. Indeed, creating effective stories often requires technical assistance in crafting, capturing, and editing stories, particularly those with a specific aim, such as a positive business, personal, or social impact goal. Consequently, it would be advantageous to have a system and method that equips users, including non-technical users, to maximize story-craft teamed with user accessible technology, such as mobile phones and tablets, to create strategic video stories with a particular aim while, potentially, having a positive effect on the persons telling their stories. Moreover, it would advantageous to have a system and method to create videos to be used in businesses and nonprofits internal and external communications while also, or alternatively, being used for an individual's own well-being and learning goals.

BRIEF SUMMARY OF THE INVENTION

The present invention is directed to a video content collection and usage system and method that, in one or more aspects, equips non-technical users to maximize story-craft and user accessible technology, such as mobile phones and tablets, to create strategic video stories with a particular aim while, potentially, having a positive impact on the persons telling their stories. Indeed, while the technology associated with video cameras in mobile phones and tablets has advanced such that users have access to near-professional video equipment, most individuals lack the story-craft to strategically create videos to achieve particular aims.

In various embodiments of the present video content collection and usage system, users are guided through how to create a strategic story, including questions to ask and answer on video, additional supporting video shots to get, and resources to help get those videos like a professional. Thereby, the present video content collection and usage system acts like a director in a user's device, like a mobile phone or tablet.

In particular embodiments, the video content collection system—a content creation system—provides a foundation for the entire system and method by creating video content that can be edited by editors or user-controlled editing technology. Indeed, in certain embodiments, the user-controlled editing technology can be used to order collected video content in a pre-designed story arc, unlike standard editing platforms, and allow the video content to be further adjusted as desired, such as by trimming or readjusting the order of video content.

In certain embodiments, the present video content collection and usage system will guide individuals to reflect on their own story in a way to promote positive well being and/or help curate custom content to benefit their own healing and growth journey. The reflections of the user are captured in video journals which are analyzed through artificial intelligence tools, such as sentiment analysis, to help identify what content from others and/or themselves might be helpful to achieve the user's healing and growth aims. Indeed, such content might include messages from psychologists or other people and could be used to help a user heal and grow in a variety of ways, such as health from depression, anxiety, insomnia, and/or racial trauma.

In various embodiments of the present video content collection and usage system, a video content collection platform is utilized to guide a user through the creation and collection of custom videos helpful to create some final content using a computing device with a camera, such as a smartphone. To guide the user, the video content collection platform utilizes templates featuring video content requests directing a user to capture custom videos related to the request. For example, video interview questions which a user could answer during the custom video.

Through the guidance of the template, the collection of the videos is organized so that a user can collect helpful videos to tell an impactful story for a desired purpose. For example, the collection of template-directed videos could introduce a hero, some event they went through, their desires, the conflict that they had to overcome to achieve their desired goal, and the growth that resulted to generate an impactful story without requiring a user to engage an expert, such as a director, or attempt to create such a storyline on their own. Without the added overhead of an expert, the ability to create impactful stories that assist users in achieving their goals becomes more available to a broader class of users, particularly those sensitive to costs such as nonprofits and startup businesses.

From the collected custom videos, the video content collection platform generates compiled data that might be used in a myriad of helpful ways to achieve a desired end goal through some final content. For example, the videos may be edited through a platform separate from the computing device collecting the videos or on the computing device itself to create marketing videos promoting a desired goal. Alternatively, the compiled content could be subjected to analysis to determine what final content would be helpful. For example, the compiled data could be provided to an analysis system that generates one or more scores based on sentiment analysis to determine appropriate therapeutic resources. Thereby, a user might be guided by a story template to create a video journal in response to prompts designed to elicit emotional context for scoring. The analysis system could then determine the sentiment in the video from the actual expressions in the video, key words utilized, or both to determine a score guiding the generation of helpful final content, such as therapy resources or personally helpful messages. In order to gain maximum effectiveness, the tools utilized in the analysis system above might be taught to recognize sentiment through artificial intelligence. Thereby, the present system might be a helpful automated low-cost supplement to a user's therapy.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
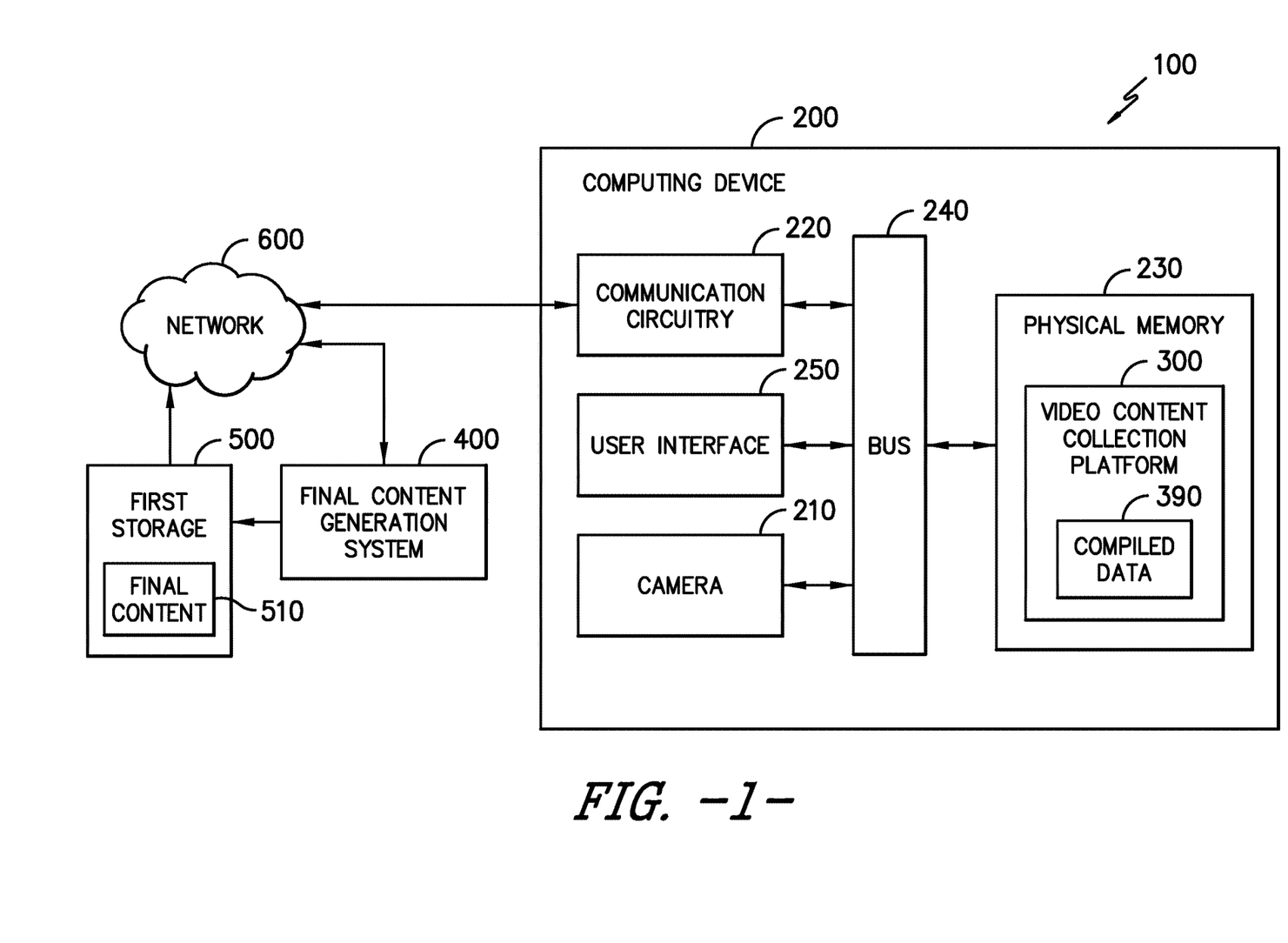
FIG. 1 is a simplified block diagram of an exemplary embodiment of a video content collection system according to the present disclosure wherein the first storage and final content generation system are disposed outside the physical memory of the computing device having the video content collection platform.
Figure 1A:
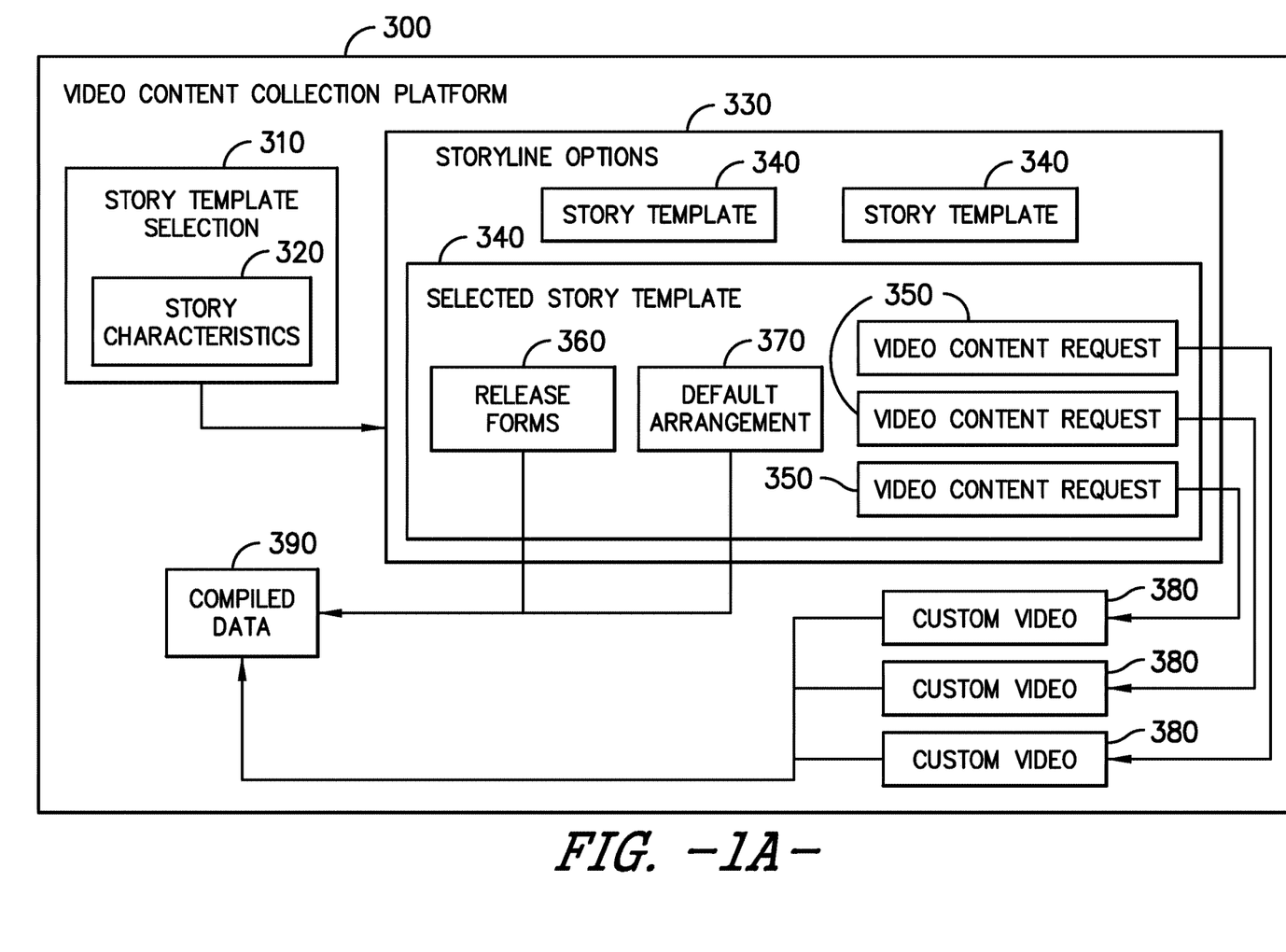
FIG. 1A is a simplified block diagram of an exemplary embodiment of the video content collection platform of a video content collection system, according to the present disclosure wherein the compiled data generated includes all or a portion of release forms, a default arrangement, and user-created custom videos.
Figure 1B:
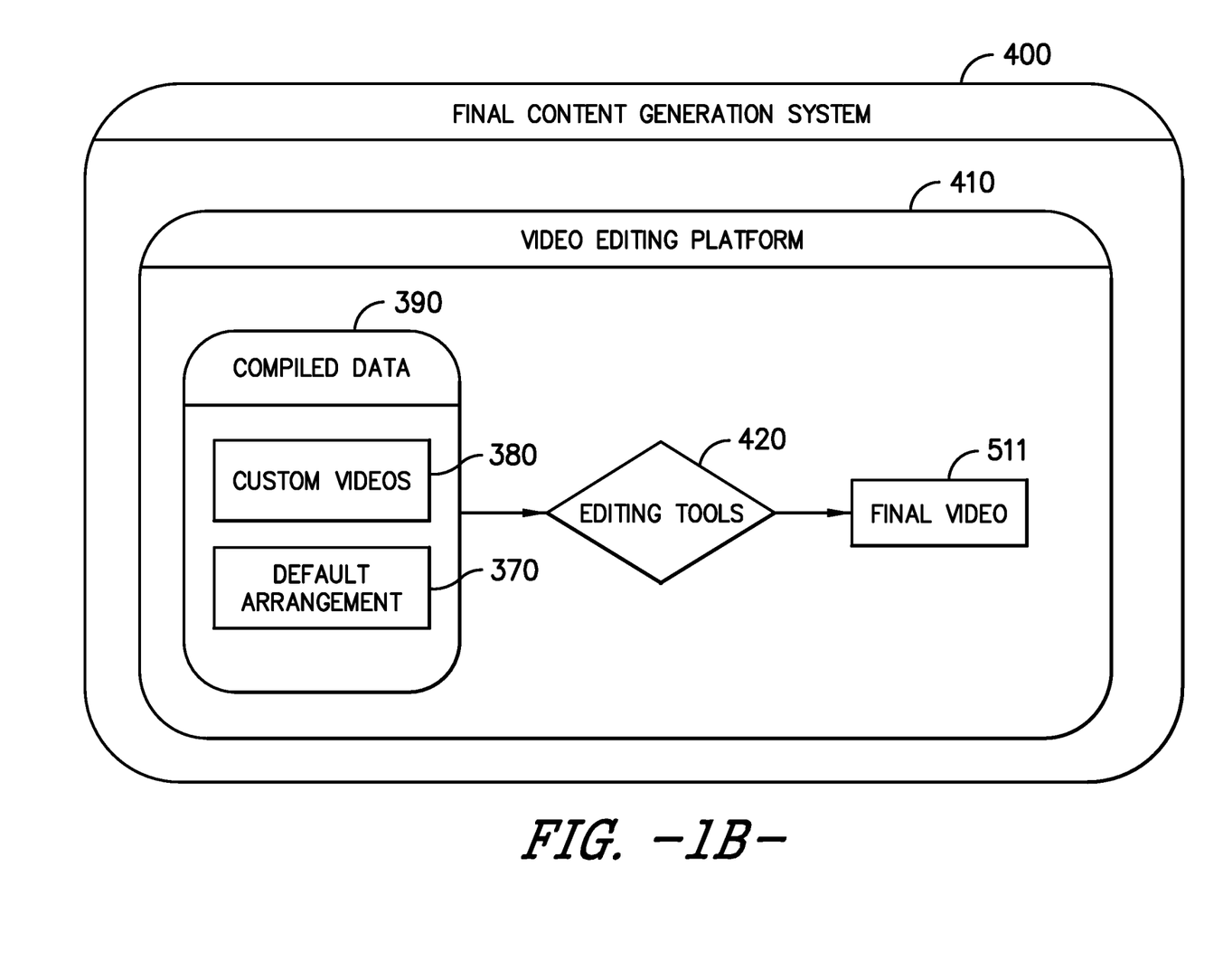
FIG. 1B is a simplified block diagram of an exemplary embodiment of the final content generation system of a video content collection system, according to the present disclosure wherein the final content comprises a final video.

With reference now to the drawings, a system and method for directed collecting of relevant video and generation of desired final content therefrom are herein described.
Representative Embodiment of the Collection and Usage System Generally FIG. 1 is a simplified block diagram of an exemplary embodiment of a video content collection and usage system 100. The system 100 thereof includes a computing device 200 having camera circuitry 210, communication circuitry 220, a user interface 250, and physical memory 230 in communication through a system bus 240. The physical memory 230 includes code for a video content collection platform 300, which guides a user in creating and collecting custom video content through a predetermined story template having video prompt requests. For example, a user could create and collect video interview content of a user-selected individual responding to interview questions as video prompt requests. This video content is then utilized by the video content collection platform 300 to create compiled data 390. FIG. 1A—discussed in greater detail below—shows a simplified block diagram of an exemplary embodiment of the video content collection platform 300 utilized to create compiled data 390. Thereafter, the compiled data 390 is transmitted to a final content generation system 400 to create final content 510 and store the content in a storage location 500. FIG. 1B—also discussed in greater detail below—shows a simplified block diagram of an exemplary embodiment of the final content generation system 400 which creates some final content 510, a final video 511 in the case of the embodiment of FIG. 1B. Thereafter, a user may then recall the final content from the storage location 500 to be viewed, shared, or otherwise utilized.
Portions of a Representative Embodiment of the Collection and Usage System In the following section, the system 100 and portions thereof will be analyzed in more detail. As shown in FIG. 1, the system 100 is generally composed of a video content collection platform 300 and a final content generation system 400.
Video Content Collection Platform As shown in FIG. 1, the video content collection platform 300 is disposed in the physical memory 230 of the computing device 200 of a user. Through the video content collection platform 300, a user is directed to collect custom videos based on a predefined story template to form at least a portion of the compiled data 390 for use in the final content generation system 400.

FIG. 1A is a simplified block diagram of an exemplary embodiment of the video content collection platform 300. The video content collection platform 300 has a story template selection 310 with some story characteristics 320 which related to the final content 510 desired. From the characteristics 320, the video content collection platform 300 identifies storyline options 330 which have one or more of the story characteristics 320 of the story template selection 310. The identified storyline options 330 have one or more story templates 340 related to the story characteristics 320 from which a user can select. The story template 340 guides a user through the collection of video content helpful to generate the desired final content 510.

Indeed, the story template 340 may guide a user through the collection of videos according to a particular storytelling framework having story elements which can create an effective story arc. Specifically, the user may be guided to create and collect video content related to various story elements, such as a hero figure, a disruption in the hero's story, the desires of the hero, the conflicts that the hero faces while pursuing their desires, how the hero grows to meet any such conflicts, any growth guides helping the hero, and a call to action relating to the hero's story. For example, a user may create custom videos highlighting a formerly homeless hero who now owns a home, including a disruption in the hero's life that caused them to become homeless, the hero's desire to own their own home, the many struggles the hero encountered during their journey, how the hero grew during their journey, what growth guides helped the hero along the way, and a call to action to help others with similar circumstances and stories.

While the aforementioned story elements here form an effective storytelling framework, it is foreseen that the storytelling framework may also have other story elements to form an effective story arc in a storytelling framework. Indeed, it is foreseen that the story elements may be informed by the desired final content 510 and story characteristics 320.

To guide a user, the story template has video content requests 350, related to the aforementioned storytelling framework and story elements, and can also have required release forms 360 and a default arrangement 370, also related to the aforementioned storytelling framework, for custom videos 380 collected. In response to the guidance of the video content requests 350, a user can then collect helpful custom videos 380 that can be used to create desired final content 510 having one or more story characteristics 320 and following the storytelling framework. After collection, the video content collection platform 300 can then generate compiled data 390 from the custom videos 380 and any information on a default arrangement 370 or release forms 360 acceptances to be used by the final content generation system 400.

Final Content Generation System

As shown in FIG. 1, in one embodiment the system 100 has a final content generation system 400 independent from but in communication through a network 600 with the computing device 200 having the video content collection platform 300. Through the final content generation system 400 the custom videos 380 collected by the user and any additional information making up the compiled data 390 are used to generate some final content 510.

FIG. 1B is a simplified block diagram of an exemplary embodiment of a final content generation system 400 used to generate a final video 511 as the final content 510. To generate the final video 511, the final content generation system 400 has a video editing platform 410 which initially places the custom videos 380 in an initial order, according to the default arrangement 370 related to the aforementioned storytelling framework, to be presented to an editing party and allows the use of editing tools 420 on the custom videos 380 presented. Thereby, the custom videos 380 are already placed into an effective order in accordance with the storytelling framework and presented to an editing party before that party utilizes the editing tools 420.

Such editing tools 420 generally allow a party to adjust the video content or audio tracks of the custom videos 380. Adjustments can include the ability to trim, join, and reorder video portions, insert text and graphical overlays onto video portions, add video transitions between video portions, apply basic corrective filters to video portions, and add to, remove, or change audio tracks for video portions. Indeed, there are many video-editing tools and one skilled in the art should recognize that any suitable means for providing such may be employed.

Moreover, it is foreseen that use of the above-mentioned editing tools 420 on the compiled data 390 may be directed by the user or another party. Whether directed by the user or a third party, through editing with the provided editing tools 420, a final video 511 is generated from the custom videos 380 of the compiled data 390. As shown in FIG. 1, this final content 510 is then stored in a storage location 500 accessible to the computing device 200 of the user for retrieval, playing, sharing, or other use.

Network

As also shown in FIG. 1, the computing device 200, having the video content collection platform 300, sends compiled data 390 to the final content generation system 400 and retrieves final content 510 from a storage location 500 through a network 600. The network 600 may be any feasible means of communication between the computing device 200, the final generation system 400, storage 500, or any other additional elements in other embodiments. For example, the network 600 may include one or more of personal, local, wireless local, campus, metropolitan, wide, storage, system, and passive optical local area networks and enterprise and virtual private networks. Additionally, the network 600 may make use of various wired and wireless data standards, such as ethernet, fiber optical, Wi-Fi and cellular. It is foreseen that the network 600 may also involve cloud networking, such as passing data through various cloud-based resources and services. These cloud-based resources and services may amend or change the compiled data 390 or final content 510 to reformat or add additional data. For example, a final video 511 may be sent to a transcribing service to prepare and format captions data to be added to a final video 511.

Method of Collecting and Using Video Content Generally

In one example of use of the aforementioned representative embodiment shown in FIGS. 1, 1A, and 1B, a user desiring to make a marketing video but not wishing to or having the resources to engage a director for the project would install a video content collection platform 300 into the physical memory 230 of their computing device 200, such as a smartphone. Upon execution of the video content collection platform 300, the user makes a selection 310, through the smartphone's user interface 250, indicating a desire to create a marketing video and including the desired story characteristics for the marketing video, as indicated in FIG. 1A. For example, the user might indicate the desire to make a marketing video spotlighting an owner or employee to promote trust and increase their business by focusing on the owner or employee's passion for the particular work and customer. The video content collection platform 300 then identifies and presents to the user storyline options 330, a selection of story templates 340, stored in its physical memory 230 that relate to the desired story characteristics 320.

From the story templates 340 presented, a user selects one which relates to their desired marketing video. Upon selection, the user is then presented with the elements which make up the story template, including prompts to fill out any release forms 360 and to record custom videos 380 related to video content requests 350 following a storytelling framework. For example, the selected story template 340 may prompt the user to fill out a release form 360 and create custom videos 380 of them answering interview questions, each question being a video content request 350 contained within the story template 340 directed to a story element of the storytelling framework. In addition, the video content requests 350 may also include instructions for particular custom video 380 content—such as a shot which zooms in on a store sign—to also fulfill story elements within the storytelling framework.

After collecting one or more custom videos 380 associated with each video content request 350, the video content collection platform 300 generates compiled data 390 which is sent to the final content generation system 400 through a network 600, as shown in FIG. 1. As shown in FIG. 1B, a video editing platform 410 on the final content generation system 400 accepts the compiled data 390 and, through the use of various editing tools 420, highlighted earlier, transforms the custom videos 380 thereof into an effective final marketing video 511 utilizing story elements of the storytelling framework, and saves the final marketing video 511 in a storage location 500. Thereafter, the video content collection platform 300 then presents the user with an indicator which, when selected, allows the computing device 200 to retrieve the final marketing video 511 from the storage location 510.

ALTERNATE EMBODIMENTS, METHOD, AND ELEMENTS

Alternate Embodiment

Figure 2:
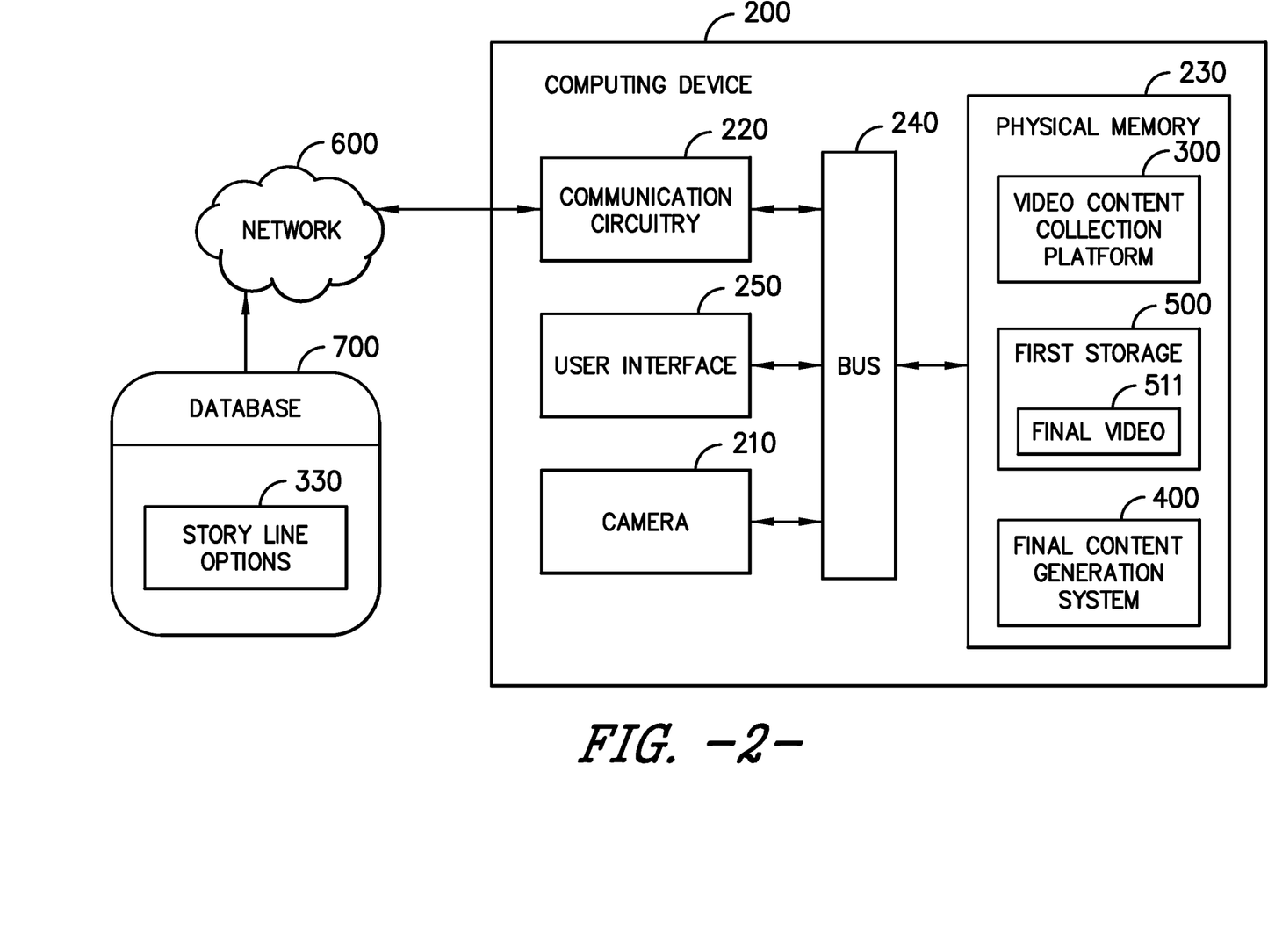
FIG. 2 is a simplified block diagram of an exemplary embodiment of a video content collection system according to the present disclosure wherein the first storage and final content generation system are disposed within the physical memory of the computing device having the video content collection platform.

FIG. 2 shows a simplified block diagram of an alternate exemplary embodiment of a video content collection and usage system 100. As shown in FIG. 2, the alternate video content collection and usage system 100 includes a computing device 200 which has physical memory 230 with a video content collection platform 300 similar to that in FIG. 1A and a final content generation system 400 similar to that in FIG. 1B. However, the physical memory 230 also has a storage location 500 for final content 510, shown as a final video 511. Moreover, the computing device 200 is linked to a data store 700, such as a database, containing storyline options 330. While a database is specifically disclosed here, in the figures, and in other embodiments, it is to be understood that many other data stores 700 are known in the art and one ore more of these or a future data store 700 technology may be utilized in various embodiments of the present system.

In use, the video content collection platform 300 requests and accepts a story template selection 310 having story characteristics 320, but all or a portion of the storyline options 330 are retrieved from an external data store 700, here a database, prior to being presented to a user. Inclusion of an external data store 700 with storyline options 330 allows story templates 340 to be added, changed, or deleted with requiring and update to the video content collection platform 300. Thereafter, a user selects a story template 340 and generates custom videos 380 according to video content requests 350 to form compiled data 390, similar to the prior disclosed method of use and FIG. 1A. However, thereafter, the compiled data 390 is sent to the final content generation system 400 within the physical memory 230 of the computing device 200. The final content generation system 400, as shown in FIG. 1B, allows the user to control the editing tools 420 converting the custom videos 380 of the compiled data 390 into a final video 511. That final video 511 is thereafter stored in storage 500 for the video content collection platform 300 to retrieve and access later.

Alternate Method and Elements

Figure 3A:
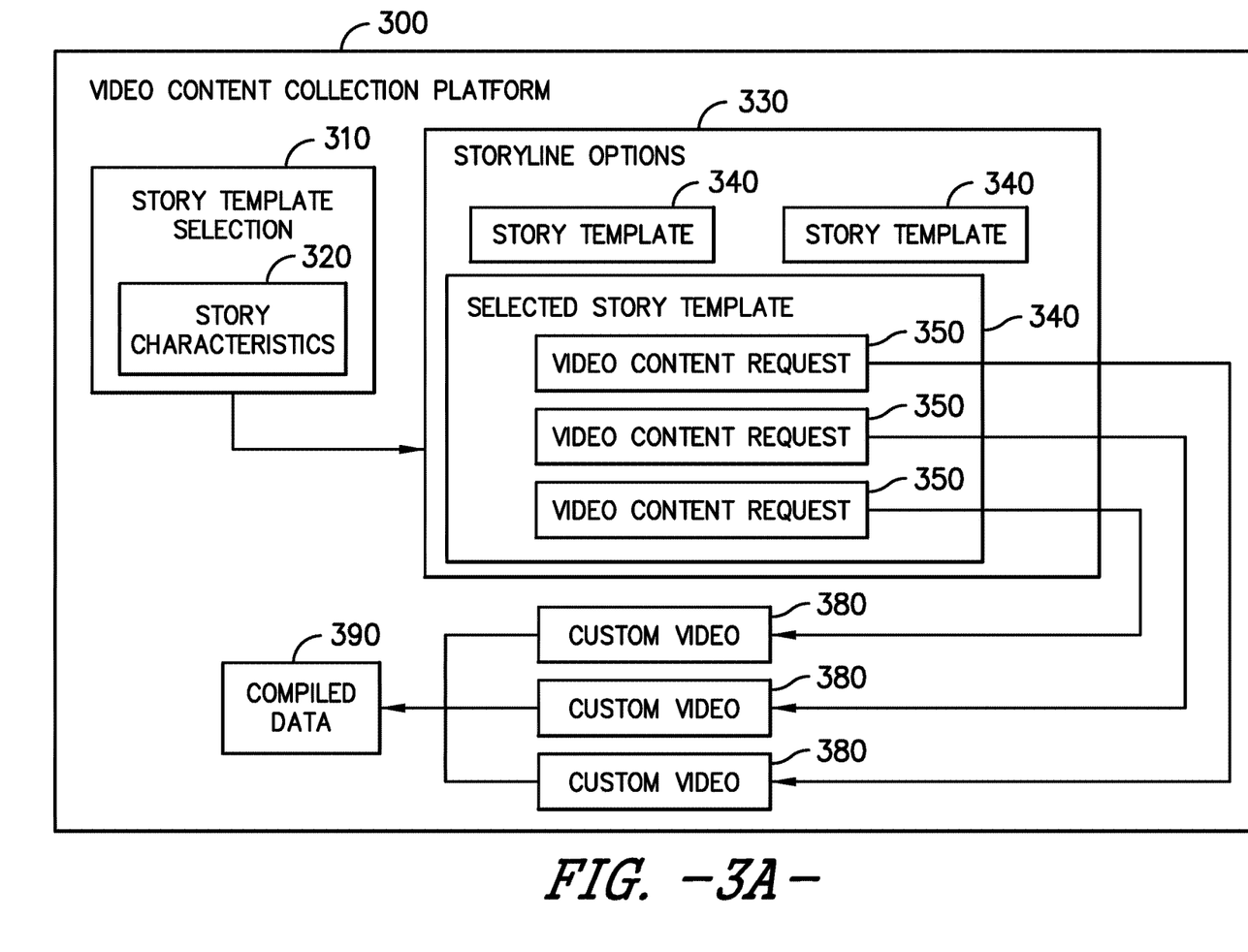
FIG. 3A is a simplified block diagram of an exemplary embodiment of the video content collection platform of a video content collection system, according to the present disclosure wherein the compiled data generated includes all or a portion of user-created custom videos to be scored for the generation of desired final content.
Figure 3B:
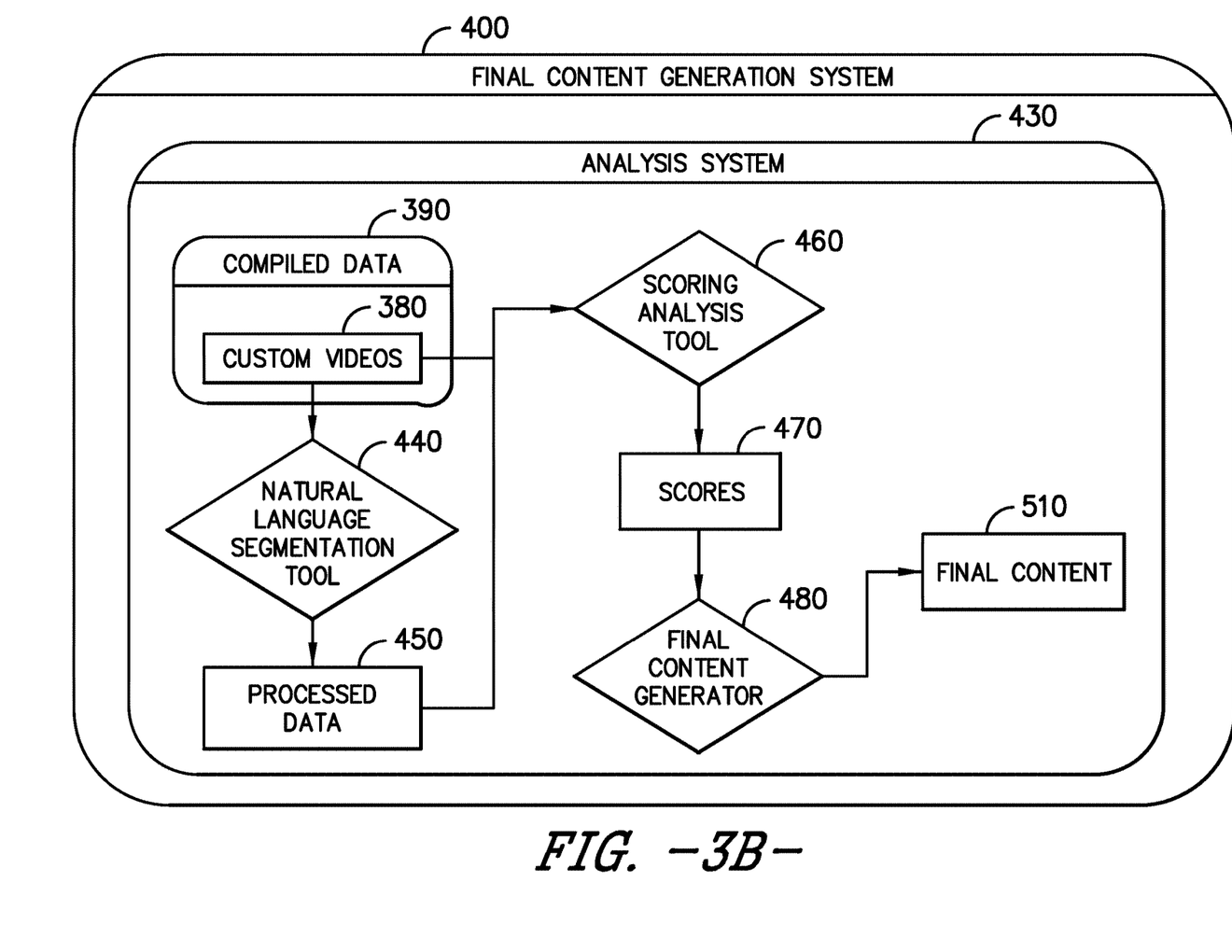
FIG. 3B is a simplified block diagram of an exemplary embodiment of the final content generation system of a video content collection system, according to the present disclosure wherein the desired curated final content is generated from scoring user-created custom videos and processed data from user-created custom videos.

In an alternative example of use, the video content collection and usage system 100 of FIG. 1 may be utilized in a therapeutic context, such as creating mental health related final content 510. However, in this alternative example of use, the video content collection platform 300 and final content generation system 400 are represented by FIGS. 3A and 3B, respectively. With respect to FIG. 3A, a user makes a story template selection 310 of story characteristics 320 centered on issues or goals they would like to achieve in relation to their therapy. In response the video content collection platform 300 identifies storyline options 330 from story templates 340 stored in an external data store 700, stored in the physical memory 230 of the computing device 200, or both. Here, the story templates 340 may represent particular therapy programs, such as one involving cognitive behavior therapy. The user then receives a collection of video content requests 350, such as discussion prompts for video journal entries, associated with the selected therapy program. With respect to the video content requests 350, the user can then create custom videos 380 relating to each which the video content collection platform 300 forms into compiled data 390.

Thereafter, the compiled data 390 is sent out to an analysis system 430 where the compiled data is analyzed to determine what goes into the final content 510. In the present alternative example, the custom videos 380 of the compiled data 390 provided are sent through a natural language segmentation tool 440 to generate processed data 450, such as a transcript or report on key words. Thereafter the processed data 450 and custom videos 380 themselves are provided to a scoring analysis tool 460. This tool 460 could comprise various functional elements which perform analyses, like a sentiment analysis on emotional expressions and transcribed data, to provide scoring 470 related to the emotional health of a subject in the custom videos 380. The functional elements of the scoring analysis tool 460 and the natural language segmentation tool 440 might be the result of one or more artificial intelligence related applications, such as if they were created with a deep learning method. Moreover, both the natural language segmentation tool 440 and scoring analysis tool 460 might be administrated by a third party. The scores 470 generated for each of the custom videos 380 may then be utilized by a final content generator 480 to determine what makes up the final content 510. For example, if a user indicated they were lonely and had emotional expressions which supported that determination, the scoring analysis tool might generate a score 470 that led the final content generator 480 to choose articles on loneliness or old custom videos where the user indicated their family or pets were always there for them to include in their final content 510. This curated final content 510 is then stored in a storage location 500 to be accessed by the computing device 200.

While the present alternative method expresses a use of compiled data related to a therapeutic benefit, it is foreseen that the video content collection platform might be utilized to create compiled data for other final content generation systems 400. Indeed, an analysis system similar to that disclosed in FIG. 3B might be utilized to create final content related to an educational context. For example, the story template 340 might include video content requests 350 related to an education subject, such as quiz questions on geography. The analysis system thereafter would score the video responses based on correct answers, and potentially the emotional expression accompanying it. Based thereupon, the final content generator would decide whether a user was ready to advance to a new topic or subject or needed additional education on the subject of the questions in the video content requests. Consequently, it is foreseen that the present system 100 and method, in the prior described embodiments or others, may be used for a variety of purposes, including but not limited to, creating marketing and internal communications for companies, fundraising for nonprofits, recruiting for colleges, creating diversity, equity, and inclusion stories, creating mental health and other therapeutic video stories, and creating educational stories.

The term "comprises", and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Although the present invention has been described in considerable detail with possible reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

In the present description, the claims below, and in the accompanying drawings, reference is made to particular elements of the invention. It is to be understood that the disclosure of the invention in this specification includes all possible combinations of such particular elements. For example, where a particular element is disclosed in the context of a claim, that element can also be employed, to the extent possible, in aspects and embodiments of the invention, and in the invention generally.

Also, although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

What is claimed is:

1. A video content collection system to guide a user, absent interaction with a directing party, in the selection and capture of one or more segments of video content for the generation and return of final content, the system comprising:
   a first computing device having camera circuitry, communication circuitry, and physical memory storing instructions that cause said first computing device to:
      provide a video content collection platform adapted to assist users with the selection and capture of video content used to generate final content;
      receive from said user a request to generate said final content through said video content collection platform;
      receive from said user a story template selection comprising one or more indicators of desired story characteristics;
      determine one or more predefined storyline options based, at least in part, on said story template selection, said one or more storyline options relating to all or a portion of said desired story characteristics;
      send information causing said one or more predefined storyline options to be presented to said user;
      receive from said user a request to utilize a story template selected from said one or more predefined storyline options presented to said user, wherein said selected story template comprises one or more video content requests;
      send information causing said one or more video content requests to be presented to said user;
      capture through said camera circuitry and store one or more custom videos associated with each of said video content requests;
      generate compiled data for said final content comprising said one or more custom videos and association of each of said one or more custom videos with at least one of said video content requests;
      communicate said compiled data to a final content generation system producing said final content from all of a portion of said compiled data;
      generate an indicator for said final content, wherein said indicator is selectable to retrieve said final content from a first storage location; and
      send information causing said indicator to be presented to said user;
   wherein said indicator enables the retrieval and access of at least a portion of said final content by said first computing device from said first storage location in response to said indicator being selected; and
   wherein said final content generation system comprises an analysis system disposed in a storage location independent of said first computing device and having physical memory storing instructions that cause said analysis system to:
      provide access to a natural language segmentation tool and scoring analysis tool;
      evaluate each of said one or more custom videos comprising said compiled data with said natural language segmentation tool;
      generate processed data comprising information on words in said one or more custom videos for each of said one or more custom videos;
      evaluate each of said one or more custom videos and associated processed data with said scoring analysis tool;
      generate at least one analysis score for said one or more custom videos;
      generate final content including predefined content selected based on said at least one analysis score; and
      store said final content in said first location.

2. The system according to claim 1, wherein said scoring analysis tool utilizes sentiment analysis.

3. The system according to claim 2, wherein said predefined content includes therapeutic resources.

4. The system according to claim 1, wherein said final content comprises an educational video.

* * * * *